(12) United States Patent
Grus et al.

(10) Patent No.: US 9,652,500 B2
(45) Date of Patent: May 16, 2017

(54) TRANSFORMATION AND CLASSIFICATION OF TIME SPENT IN COLLABORATIVE ACTIVITIES FOR ASSESSING ORGANIZATIONAL PRODUCTIVITY AND EFFECTIVENESS

(71) Applicant: VoloMetrix, Inc., Seattle, WA (US)

(72) Inventors: Joel Grus, Seattle, WA (US); Tim Crain, Seattle, WA (US); Sunil Sayala, Seattle, WA (US); Ryan Fuller, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 14/292,753

(22) Filed: May 30, 2014

(65) Prior Publication Data

US 2016/0371334 A1 Dec. 22, 2016

(51) Int. Cl.
G06F 17/30 (2006.01)
G06Q 10/06 (2012.01)
G06Q 10/10 (2012.01)

(52) U.S. Cl.
CPC .. *G06F 17/30489* (2013.01); *G06F 17/30699* (2013.01); *G06Q 10/063* (2013.01); *G06Q 10/107* (2013.01)

(58) Field of Classification Search
None
See application file for complete search history.

(56) References Cited

U.S. PATENT DOCUMENTS

| 7,853,653 | B2 * | 12/2010 | Wesen | H04L 12/5885 |
| | | | | 709/206 |
| 8,271,631 | B1 | 9/2012 | Horvitz et al. | |
| 2005/0164651 | A1 | 7/2005 | Ollis et al. | |
| 2006/0093126 | A1 * | 5/2006 | Wesen | H04L 12/5885 |
| | | | | 379/265.09 |
| 2006/0265262 | A1 * | 11/2006 | Kamdar | G06Q 10/109 |
| | | | | 705/80 |

(Continued)

FOREIGN PATENT DOCUMENTS

WO WO 2009 114065 * 9/2009

OTHER PUBLICATIONS

International Search Report and Written Opinion mailed Jul. 2, 2015 from PCT Application No. PCT/US2015/022090, 10 pages.

*Primary Examiner* — Hung Le
(74) *Attorney, Agent, or Firm* — Rainier Patents, P.S.

(57) ABSTRACT

The assessing of collaboration time includes the extraction of collaboration data from collaborators and storing the collaboration data as a dataset. Attributes for each of the collaborators is defined, and a group of collaborators is defined by filtering based on the attributes. For the dataset, collaboration time is assigned for each member of the group using the collaboration data. Data from certain activities by collaborators are mined as representative of the collaboration activities, and in combination with organizational structure data, time is allocated between people, teams, and companies for the purpose of assessing organizational productivity and effectiveness. No manual data gathering or imposition on collaborators to provided data is required. Real data for the collaborative activities are used, instead of self-reported data. This provides a more granular picture of how time is allocated to relationships and activities than could be gathered manually.

23 Claims, 8 Drawing Sheets

(56) References Cited

U.S. PATENT DOCUMENTS

| | | | |
|---|---|---|---|
| 2008/0270211 A1* | 10/2008 | Vander Veen | G06Q 10/107 705/7.19 |
| 2009/0193048 A1* | 7/2009 | Nalla | G06Q 10/1091 |
| 2009/0210351 A1* | 8/2009 | Bush | G06Q 10/109 705/80 |
| 2010/0211424 A1* | 8/2010 | Hill | G06Q 10/0631 705/7.18 |
| 2011/0125545 A1* | 5/2011 | Lehmann | G06Q 10/00 705/7.24 |
| 2011/0231409 A1* | 9/2011 | Dhara | H04L 12/1818 707/748 |
| 2013/0006690 A1 | 1/2013 | Doss et al. | |
| 2013/0117058 A1 | 5/2013 | Norton et al. | |
| 2013/0117060 A1* | 5/2013 | Henriksen | G06Q 10/06 705/7.21 |
| 2013/0179501 A1* | 7/2013 | Murphy, Jr. | G06Q 10/1095 709/204 |
| 2013/0317874 A1* | 11/2013 | Kozloski | G06Q 10/109 705/7.19 |
| 2014/0136630 A1* | 5/2014 | Siegel | G06Q 10/1095 709/206 |
| 2014/0200944 A1* | 7/2014 | Henriksen | G06Q 10/1095 705/7.19 |
| 2014/0236876 A1* | 8/2014 | Hapse | G06N 3/08 706/18 |
| 2014/0280359 A1* | 9/2014 | Baecklund | G06F 17/30958 707/798 |
| 2015/0088997 A1* | 3/2015 | van Dijk | G06Q 10/109 709/206 |
| 2015/0200978 A1* | 7/2015 | Putterman | H04L 51/043 709/204 |

* cited by examiner

TRANSFORMATION AND CLASSIFICATION OF TIME SPENT IN COLLABORATIVE ACTIVITIES FOR ASSESSING ORGANIZATIONAL PRODUCTIVITY AND EFFECTIVENESS

BACKGROUND OF THE INVENTION

Managers in organizations often have limited visibility into how employees and teams spend their time and are forced to make many decisions based on anecdotes which may not represent what is actually happening. Due to a lack of transparency on how members of an organization is spending their time, it is difficult to have data driven discussions or to make decisions on where time should or shouldn't be invested. For some functions or industries, data on how the workers spend their time are difficult to gather. One example of such a function or industry is information workers who spend a large amount of time in meetings, collaborating with colleagues via email or performing other tasks. To address this lack of visibility and the business problems it creates, companies will sometimes conduct surveys or interview processes to manually gather data on where time is spent. However, the manual gathering of data through surveys or interviews is labor intensive, expensive, results in low quality self-reported data, disrupts the culture, and provides only a one-time snapshot that is marginally useful.

BRIEF SUMMARY OF THE INVENTION

According to one embodiment of the present invention, a method for assessing collaboration time includes the extraction of collaboration data from a plurality of collaborators and storing the collaboration data as a dataset. The collaboration data includes data from sent mails in mailboxes and meetings in calendars of each of the plurality of collaborators. A plurality of attributes for each of the plurality of collaborators is defined, and a group of collaborators is defined by filtering based on the plurality of attributes. For the dataset, collaboration time is assigned for each member of the group using the collaboration data.

In one aspect of the present invention, in extracting the collaboration data, sent mails in mailboxes and meetings in calendars of each of the plurality of collaborators are mined and stored as the dataset.

In one aspect of the present invention, one or more pre-computations may be performed. The pre-computations may include a meeting de-duplication process, an attendee de-duplication process, an hours adjustment process, and a non-meeting removal process.

For each meeting, in the meeting de-duplication process, it is determined whether two or more meetings include overlapping times for one or more attendees. If so, then the time durations for the two or more meetings are adjusted, such that the adjusted time durations do not exceed an actual time duration for the two or more meetings.

For each meeting, in the attendee de-duplication process, it is determined whether a given meeting includes duplicate attendees. If so, then one of the duplicate attendees is removed from the given meeting.

For each meeting, in the hours adjustment process, it is determined whether the given meeting comprises an all-day, all-week, or recurring meeting. If so, then a time duration of the given meeting is adjusted to reflect a work-day length for each day of the given meeting.

For each meeting, in the non-meeting removal process, it is determined the given meeting is a real meeting. If not, then the given meeting is removed from the dataset.

In one aspect of the present invention, a time allocation method is used to assign the collaboration data. A plurality of partitions is defined, where the plurality of partitions represent different types of collaborations involving the group.

In the time allocation method, for each given member of the group, it is determined if a given meeting includes the given member as an attendee. If so, then the partition matching the other attendees of the given meeting is determined, and a collaboration time for the given member is allocated to the matching partition.

In the time allocation method, for each given member of the group, when it is determined that a given electronic mail is sent by the given member, the partition matching recipients of the given electronic mail is determined. Also determined is a delta time between the sending of the given electronic mail and an immediately previously sent electronic mail by the given member. the lessor of the collaboration time or the delta time for the given member is then allocated to the matching partition.

In the time allocation method, for each given member of the group, it is determined whether a given electronic mail is received by the given member from a sender in the dataset. If so, then the partition matching the sender is determined, and a collaboration time for the given member is allocated to the matching partition.

In the time allocation method, for each given member of the group, it is determined whether a given electronic mail is sent by the given member to a recipient not in the dataset. If so, then a mail is imputed to be received by the given member from the recipient not in the dataset. The partition matching the recipient not in the dataset is then determined, and a collaboration time for the given member is allocated to the matching partition.

In one aspect of the present invention, a time spent method is used to assign the collaboration data. Time groupings are defined, where the time groupings represent how a given member's spent time will be counted.

In the time spent method, it is determines whether a given meeting includes the given member as an attendee. If so, then a collaboration time is added to a total collaboration time associated with one or more of the time groupings based on each attendee of the given meeting.

In the time spent method, it is determined whether a given electronic mail is sent by the given member. If so, then a collaboration time is added to a total collaboration time associated with one or more of the time groupings based on each recipient of the given electronic mail.

In the time spent method, it is determined whether a given electronic mail is received by the given member from a sender in the dataset. If so, then a collaboration time is added to a total collaboration time associated with one or more of the time groupings based on the sender.

In the time spent method, it is determined whether a given electronic mail is sent by the given member to a recipient not in the dataset. If so, then a mail is imputed to be received by the given member from the recipient not in the dataset, and a collaboration time is added to a total collaboration time associated with one or more of the time groupings based on the recipient not in the dataset.

In one aspect of the present invention, a method for assessing collaboration time further includes determining push and pull numbers. The push and pull numbers are initialized, where the push number represents other people's time that the given member initiates, and the pull number represents the given member's time initiated by the other people.

In determining the push and pull numbers, it is determined whether a given meeting includes the given member as an attendee. If so, then it is determined whether the given member initiated the given meeting. If the given member initiated the given meeting, then a collaboration time is added to the push number for each attendee of the given meeting. If the given member did not initiate the given meeting, then a collaboration time is added to the pull number.

In determining the push and pull numbers, it is determined whether a given electronic mail is sent by the given member. If so, then a collaboration time is added to the push number for each recipient of the given electronic mail.

In determining the push and pull numbers, it is determined whether a given electronic mail is received by the given member from a sender in the dataset. If so, then a collaboration time is added to the pull number.

In determining the push and pull numbers, it is determined whether a given electronic mail is sent by the given member to a recipient not in the dataset. If so, then a collaboration time is added to the pull number for each recipient of the given electronic mail.

System and computer program products corresponding to the above-summarized methods are also described and claimed herein.

DETAILED DESCRIPTION OF THE INVENTION

Figure 1:
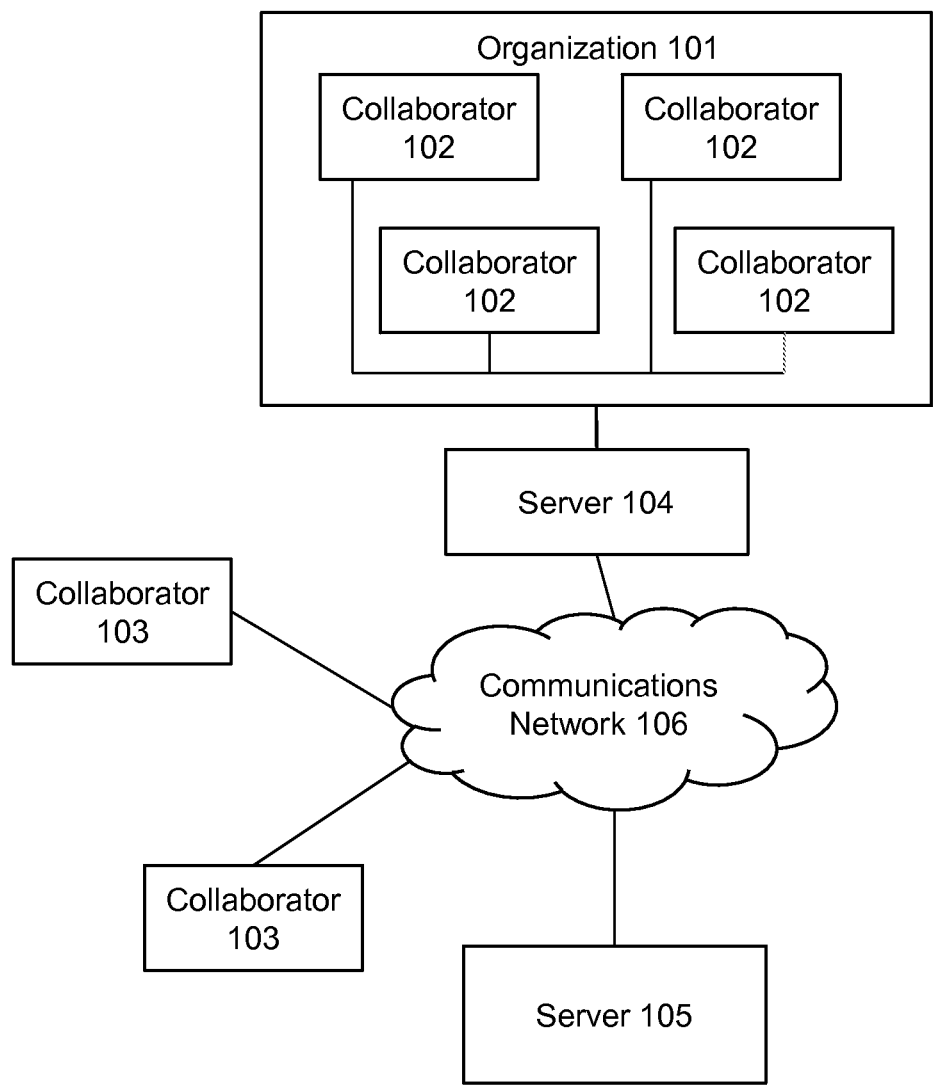
FIG. 1 illustrates a system for assessing organizational productivity and effectiveness according to embodiments of the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or compute readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a system for assessing organizational productivity and effectiveness according to embodiments of the present invention. The system includes an organization 101, which includes a plurality of people (internal collaborators 102) engaged in collaborative activities with each other and/or with persons external to the organization 101 (external collaborators 103). The collaborators 102 may be all of the people at the organization 101 or some sub-set. Some, but not necessarily all, of the collaborative activities may be over a communications network 106, such as the Internet, a cellular network, or virtual private network (VPN). The collaborators 102 may collaborate via a server 104 providing certain services, such as e-mail hosting, inter-organizational data sharing, and/or various cloud services. The server 105 provides an assessment service to the organization 101, including allocating time spent on collaborative activities by the collaborators 102 for the purpose of such an assessment. Each collaborator 102 and 103, and the servers 104 and 105, may be a computer system as illustrated in FIG. 2.

Figure 2:
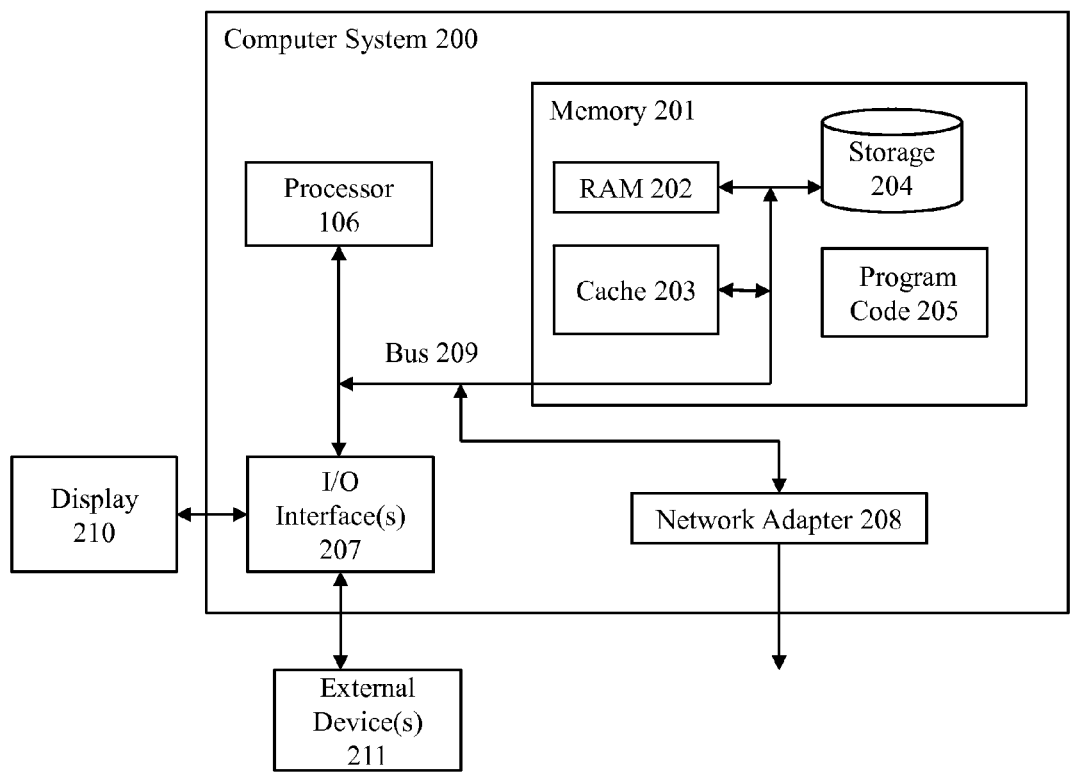
FIG. 2 illustrates a computer system according to embodiments of the present invention.

FIG. 2 illustrates a computer system according to embodiments of the present invention. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211, such as a display 210, via I/O interfaces 207. The computer system 200 may communicate with one or more networks via network adapter 208.

Figure 3:
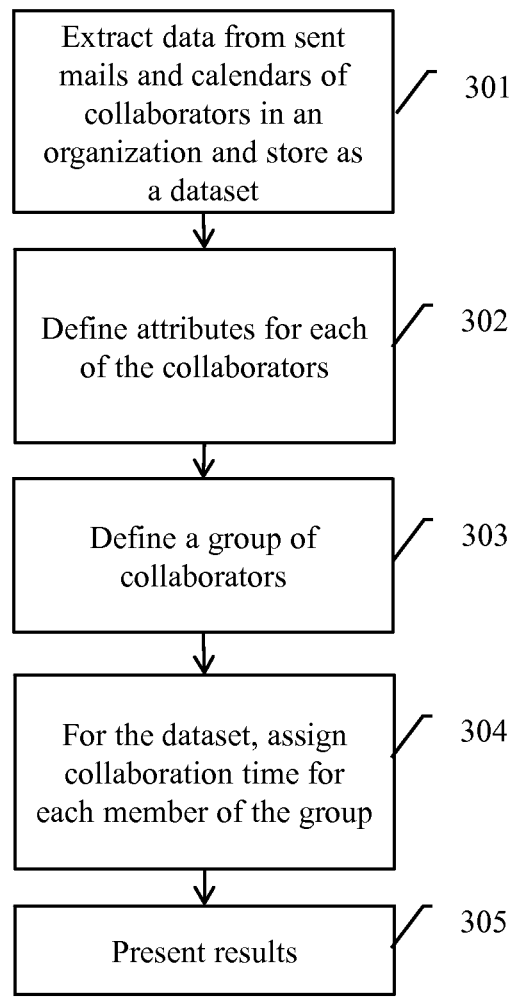
FIG. 3 is a flowchart illustrating a method for assessing organizational productivity and effectiveness according to embodiments of the present invention.

FIG. 3 is a flowchart illustrating a method for assessing organizational productivity and effectiveness according to embodiments of the present invention. In this embodiment, the server 105 implements the method with the cooperation of the computer systems 200 at the collaborators 102 and/or the server 104. Mails sent and meetings attended by the collaborators 102 within an organization are used as representative of the collaborative activities. The method extracts the data from the sent mails and calendars of the collaborators 102 in the organization 101 and stores the data as a dataset (301). The server 105 may access the mailboxes and calendars of the collaborators 102 from their computer systems or the server 104. Attributes are defined for each of the collaborators 102 (302). Example attributes may include, but are not limited to: role; level; location; region; department; function; and domain. By filtering based on these attributes, a "group" of the collaborators 102 is defined (303), the members of which whose time is being allocated. Then, for the dataset, the server 105 assigns the collaboration time for each member of the group (304). The results may then be presented for assessment purposes (306).

Figure 4:
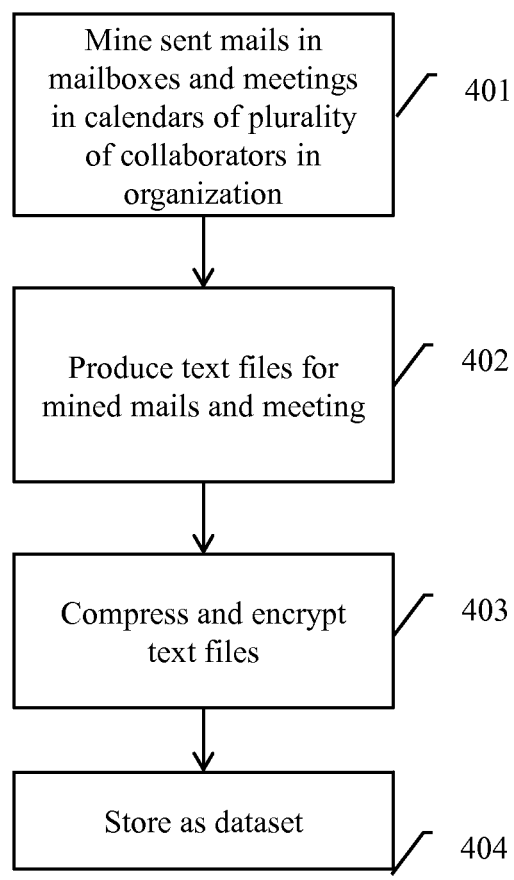
FIG. 4 is a flowchart illustrating in more detail the extraction of data from the mails and calendars of the collaborators in the organization, according to embodiments of the present invention.

FIG. 4 is a flowchart illustrating in more detail the extraction of data from the mails and calendars of the collaborators in the organization, according to embodiments of the present invention. The server 105 mines the sent mails in the mailboxes and the meetings on the calendars of a plurality of collaborators (401). In this embodiment, only the headers of each sent mail are extracted for privacy and data security purposes. Example header data that are extracted includes, but are not limited to: identity of the sender; identity of each recipient; subject line; and date and time sent. For the meetings on a calendar, the data that is extracted includes, but is not limited to: identity of the collaborator on whose calendar is meeting is found; identity of each attendee; duration of the meeting; identity of the meeting organizer; and location of the meeting. Text files are then produced by the server 105 for the mined mails and meetings (402). In this embodiment, one folder is created for each mailbox mined. Each mail and meeting is disassembled into components for easier storage in the text files. The text files are then compressed and encrypted (403) and stored as the dataset in a database (404). Other methods of storing the mined mails and meetings may be used without departing from the spirit and scope of the present invention.

Figure 5:
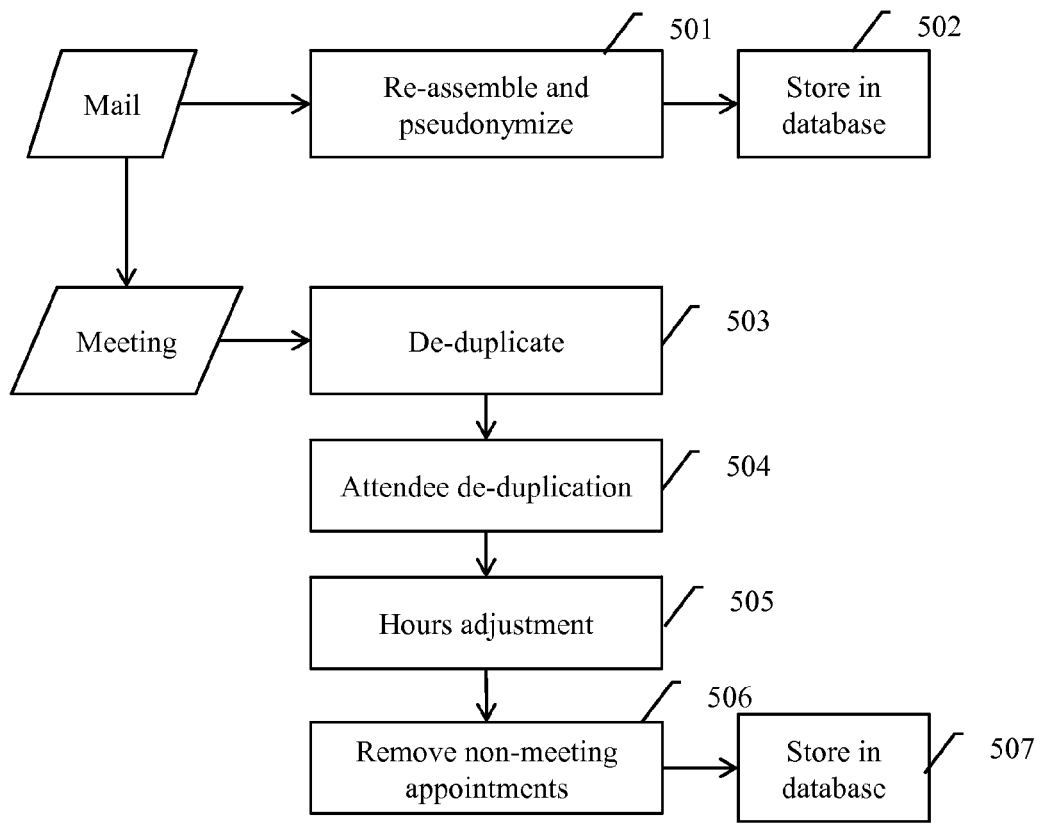
FIG. 5 is a flowchart illustrating a pre-computation method according to embodiments of the present invention.

Once the dataset is obtained, allocation of collaboration time may then be performed. Optionally, prior to this time allocation, some pre-computations may be performed to "clean" the mails and meetings in the dataset. FIG. 5 is a flowchart illustrating a pre-computation method according to embodiments of the present invention. The computations illustrated here may instead be performed during the time allocation process, described further below. In the pre-computations, the text files of the dataset are decompressed and decrypted. The mails are then each re-assembled and pseudonymized (501) and stored back into the database (502). In this embodiment, each email address is associated with a unique identifier for privacy and data security purposes. The mapping between the email addresses and the identifiers are stored in a separate mapping file, which is not loaded for the time allocation process. The pseudonymizing of the mail is optional and may be omitted when non-anonymous reports are desired. For meetings, the pre-computations may include a meeting de-duplication process (503) and an attendee de-duplication process (504). The meeting de-duplication process identifies overlapping meetings, i.e., where an attendee is scheduled to attend two or more meetings with overlapping times. In this embodiment, the meeting time for each meeting is adjusted such that the adjusted time durations (i.e., the meeting time to be assigned) does not exceed the actual time duration for the meetings. For example, assume that A and B is scheduled to meet from 1 pm to 2 pm, but A is also scheduled to meet with C from 1:30 pm to 2 pm. The total meeting time to be allocated here is 1 hour. For A, 0.5 hours of the meeting time would be allocated to the meeting with B, and 0.5 hours would be allocated to the meeting with C. B would be allocated 1 hour, and C would be allocated 0.5 hours. The attendee de-duplication process identifies multiple responses to a meeting invitation from the same attendee, which may cause this attendee to be listed twice for the same meeting. In this embodiment, the later response by the attendee is favored, and the earlier response is removed.

The pre-computations for meetings further include an hours adjustment process (505) and a process to remove non-meeting appointments (506). In the hours adjustment process, hours for certain meetings are adjusted to more accurately reflect the collaboration time. For example, all-day, all-week, or recurring meetings are adjusted to be no more than a work day length per day, such as 8 hours of collaboration time a day. This is to avoid a 24 hour time allocation. In the process to remove non-meeting appointments, meetings on the calendar which are likely non-meetings are removed from the dataset. For example, meetings tagged as vacations, doctor's appointments, pick up kids, etc. are removed as they are not actual meetings. Meetings with zero attendees may also be removed as non-meeting appointments. A machine-learning model may be used to predict whether a meeting on a calendar is "real" or a non-meeting. The cleaned meetings are stored back into the database (507).

Time Allocation

Figure 6:
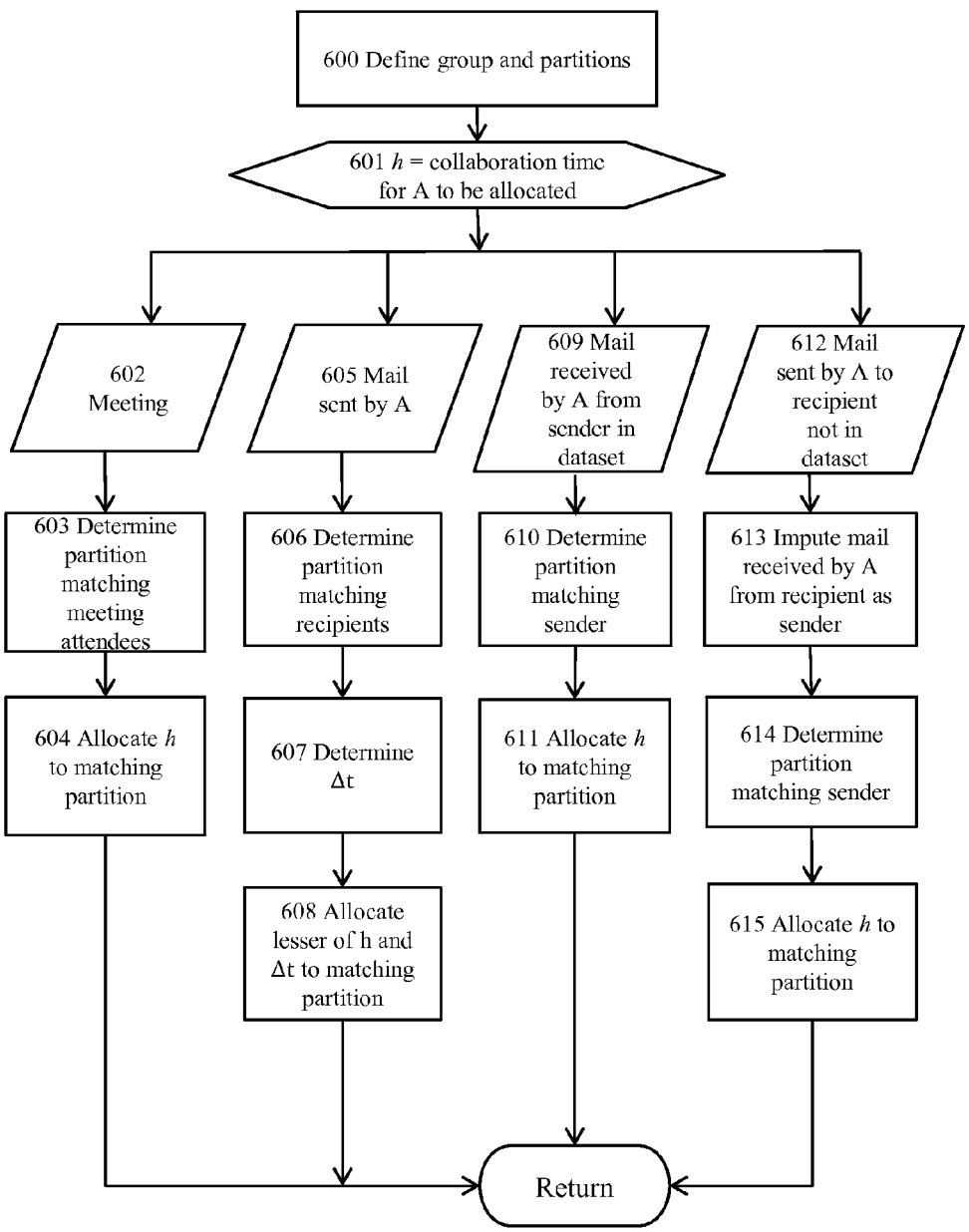
FIG. 6 is a flowchart illustrating the time allocation method according to embodiments of the present invention.

In one approach according to the present invention, collaboration time for each member of a group is assigned using a time allocation method. FIG. 6 is a flowchart illustrating the time allocation method according to embodiments of the present invention. A group of collaborators and a plurality of partitions are defined (600). A group is defined by filtering the attributes associated with a plurality of collaborators 102. It is for this group whose time is being allocated. A single person "group" is possible. For example, a group may be defined as collaborators in a specific region or a particular business unit within the organization 101. Partitions representing different types of collaborations involving the group are also defined. For example, partitions may be by "internal/external", where "internal" represents collaborators 102 within the organization 101 and "external" represents collaborators 103 external to the organization 101. In other examples, partitions may be by function or by domain. In the internal/external scenario, example partitions may be:
  only involves collaborators from the group;
  involves internal collaborators not from the group and no external collaborators;
  involves internal collaborators not from the group and external collaborators; and
  involves no internal collaborators not from the group and some external collaborators.
In the by function scenario, example partitions may be:
  only involves collaborators from the group;
  Function A;
  Function B; . . . and
  external collaborators involved.
In the by domain scenario, example partitions may be:
  doesn't involve external collaborators;
  partner1.com; and
  partner2.com; . . . .
In each scenario, the same amount of total time is allocated across the partitions.

In this embodiment, the following basic time allocation rules are used (where A is a collaborator from the group whose time is being allocated):
  When A attends a meeting, A's time will be allocated based on the identities of the other attendees. (In this embodiment, the identity of the meeting organizer is not considered.

When A sends a mail, A's time will be allocated based on the identities of the recipients. A recipient includes those identified in the cc and bcc fields.
  When A receives a mail, A's time will be allocated based on the identity of the sender. (In this embodiment, the identities of the other recipients are not considered.)

Assume that h is the collaboration time for A. The value of h may vary depending on the collaboration activity type, and may be tunable. When the collaboration activity type is a meeting (602), h=time duration of the meeting to be allocated, possibly adjusted as described above with reference to FIG. 5. The server 105 determines the partition that matches the meeting attendees (other than A) (603). If any the adjustments to h described above with reference to FIG. 5 were not performed as part of the pre-computation process, then these adjustment can be performed during the time allocation process prior to the matching to a partition. Then, h is allocated to the matching partition (604).

When the collaboration activity type is a mail sent by A (605), the server 105 determines the partition that matches the recipient(s) of the mail (606). The server 105 also determines the time between this mail and any mail sent by A immediately prior ($\Delta t$) (607). The server 105 then allocates the lesser of h and $\Delta t$ to the matching partition (608). In this way, double-counting time for multiple emails can be avoided. For example, assume that 5 minutes is the amount of time to be allocated for each sent mail. Assume also that A sends a first mail at 8:00 am and a second mail at 8:02 am. For the first mail, 5 minutes of A's time is allocated, while the second mail is allocated 2 minutes. This ensures that the time allocated for mails sent within a certain time period does not exceed the length of the time period. Further, in this embodiment, no time is allocated for any mail sent by A where the only recipient is A.

For mail received by A from a sender in the dataset (609), A's collaboration time as a mail recipient would be captured when this sender's sent mails are processed. The server 105 determines the partition matching the sender (610), and h is then allocated to the matching partition (611). However, when a sender is not in the dataset, collaboration time for A as a mail recipient cannot be captured directly since this sender's mailbox is not included in the dataset. To capture collaboration time for mail received by A from a sender not in the dataset (612), A is assumed to receive mail from recipients not in the dataset in response to a mail sent to the recipient by A. In other words, A is imputed to receive mail from this recipient as a sender (613). The server 105 determines the partition that matches the (imputed) sender (614) and allocates h to the matching partition (615).

Steps 601-615 are repeated for each member of the group.

Consider the following example in which each collaborator is associated with attributes that includes a Function and a Region, and a Group is defined as {Function=Sales and Region=West}. Assume a plurality of collaborators includes the following people with their corresponding attributes:
  Alice {Sales, West}
  Bob {Sales, West}
  Charlie {Sales, East}
  Dave {HR, East}
  Eddie {OPS, Central} [no mailbox]
  Fred {domain1.com}
  Gene {domain2.com}
  Heidi {domain2.com}
  Iris {domain2.com}.
Here, the Group includes Alice and Bob. Charlie, Dave, and Eddie are internal collaborators who are not from the Group.

Fred, Gene, Heidi and Iris are external collaborators. Assume that the following partitions are defined by interactions between groups of people:
"Within-group": only involves collaborators from the Group;
"Other Internal": involves internal collaborators not from the Group and no external collaborators;
"Other Internal+External": involves internal collaborators not from the Group and external collaborators; and
"External Only": involves no internal collaborators not from the Group but some external collaborators.

For a 1-hour meeting with the above attendees (602), the meeting attendees are matched to the "Other Internal+External" partition (603). Two hours (1 hour for Alice and 1 hour for Bob) are then allocated to the Other Internal+External partition (604).

For the same 1-hour meeting, assume the following partitions are defined by function:
"Within-group": only involves collaborators from the Group;
"Other Internal": involves internal collaborators not from the Group; if there are m non-group member internal attendees, with $m_1$ in function 1, ... $m_k$ in function k, then allocate $h*(m_1/m)$ time to function 1, ... , and $h*(m_k/m)$ time to function k; and
if there only external attendees, then h is allocated to the External Only partition.

Since there are three non-Group internal attendees (Charlie, Dave, and Eddie), the 1 hour is allocated to the Other Internal partition by dividing it among the functions as follows:
Sales: ⅔ hour, 1 meeting (for Charlie)
HR: ⅔ hour, 1 meeting (For Dave)
OPS: ⅔ hour, 1 meeting (For Eddie)

For the same 1-hour meeting, assume the following partitions are defined by region:
"Within-group": only involves attendees from the Group;
"Other Internal": if there are m non-group member internal attendees, with $m_1$ in region 1, ... $m_k$ in region k, then allocate $h*(m_1/m)$ time to region 1, ... , and $h*(m_k/m)$ time to region k; and
"External Only": only external attendees.

Since there are three non-Group internal attendees (Charlie, Dave, and Eddie), the 1 hour is allocated to the Other Internal partition by dividing it among the regions as follows:
East: ⅔ hour, 1 meeting (for Charlie and Dave)
Central: ⅓ hour, 1 meeting (for Eddie)

For the same 1-hour meeting, assume the following partitions are defined by external partner:
"Internal": only involves collaborators from the Group;
"External": if there are m external attendees, with $m_1$ from Domain 1, ... $m_k$ from Domain k, then allocate $h*(m_1/m)$ time to Domain 1, ... , and $h*(m_k/m)$ time to Domain k; and Since there are four collaborators at Domains 1 and 2, the 1 hour is allocated to the External partition by dividing it among the domains as follows:
Domain 1: ¼ hour, 1 meeting (for Fred)
Domain 2: ¾ hour, 1 meeting (for Gene, Heidi, and Iris)

Assume that Alice sends a mail to the above collaborators. In this example, 5 minutes is allocated for each sent mail and 2.5 minutes for each received mail. For the above partitions defined by interactions between groups of people, collaboration time would be allocated as follows:

For Alice, this is a sent mail (605), so 5 minutes is allocated to "Other Internal+External partition (607-608);
For Bob, this is a received mail from a sender (Alice) in the dataset (609), so 2.5 minutes are allocated to the "Within-group" partition (610-611);
Eddie has no mailbox and is thus a recipient not in the dataset (612). Alice is imputed to receive a mail from Eddie (613), and 2.5 minutes are allocated to the "Other internal" partition (614-615);
Fred, Gene, Heidi, and Iris are also recipients not in the dataset (612). Alice is imputed to receive a mail from each of them (613), and 2.5 minutes for each of them are allocated to the "External only" partition (614-615).

This yields a total of 20 minutes of collaboration time for the Group.

For the same email sent by Alice, assume the same partitions defined by function above. Since there are three non-Group internal attendees (Charlie, Dave, and Eddie), the 5 minutes are allocated to the Other Internal partition (610-611) by dividing it among the functions as follows:
Sales: 5*⅓ minutes, 1 mail (for Charlie)
HR: 5*⅓ minutes, 1 mail (for Dave)
OPS: 5*⅓ minutes, 1 mail (for Eddie)

In addition, 2.5 minutes are allocated to the Within-group partition for Bob as the recipient in the dataset (610-611). 2.5 minutes are allocated to OPS in the Other Internal partition, imputed for Eddie as a recipient not in the dataset (613-615). 2.5*4 minutes are allocated to the External Only partition, imputed for Fred, Gene, Heidi, and Iris as recipients not in the dataset (613-615).

For the same email sent by Alice, assume the same partitions defined by region above. Since there are three non-Group internal recipients (Charlie, Dave, and Eddie), the 5 minutes are allocated to the Other Internal partition (610-611) by dividing it among the regions as follows:
East: 2*(5*⅓) minutes, 1 mail (for Charlie and Dave)
Central: 5*⅓ minutes, 1 mail (for Eddie)

In addition, 2.5 minutes are allocated to the Within-group partition for Bob as the recipient in the dataset (606-608). 2.5 minutes are allocated to OPS in the Other Internal partition, imputed for Eddie as a recipient not in the dataset (613-615). 2.5*4 minutes are allocated to the External Only partition, imputed for Fred, Gene, Heidi and Iris as recipients not in the dataset (613-615).

For the same email sent by Alice, assume the same partitions defined by external partner above. Since there are four external recipients (Fred, Gene, Heidi, and Iris), the 5 minutes are allocated to the External partition (613-615) by dividing it among the domains as follows:
Domain 1: 5*¼ minutes, 1 mail (for Fred)
Domain 2: 3*(5*¼) minutes, 1 mail (for Gene, Heidi, and Iris)

In addition, 2.5 minutes are allocated to the Internal partition for Bob as the recipient in the dataset (606-608). 2.5 minutes are allocated to the Internal partition for an imputed mail from Eddie to Alice (613-615). 2.5 minutes are allocated to Domain 1 in the External partition for an imputed mail received by Alice from Fred (613-615). 7.5 minutes are allocated to Domain 2 in the External partition for imputed mails received by Alice from Gene, Heidi, and Iris (613-615).

Figure 7:
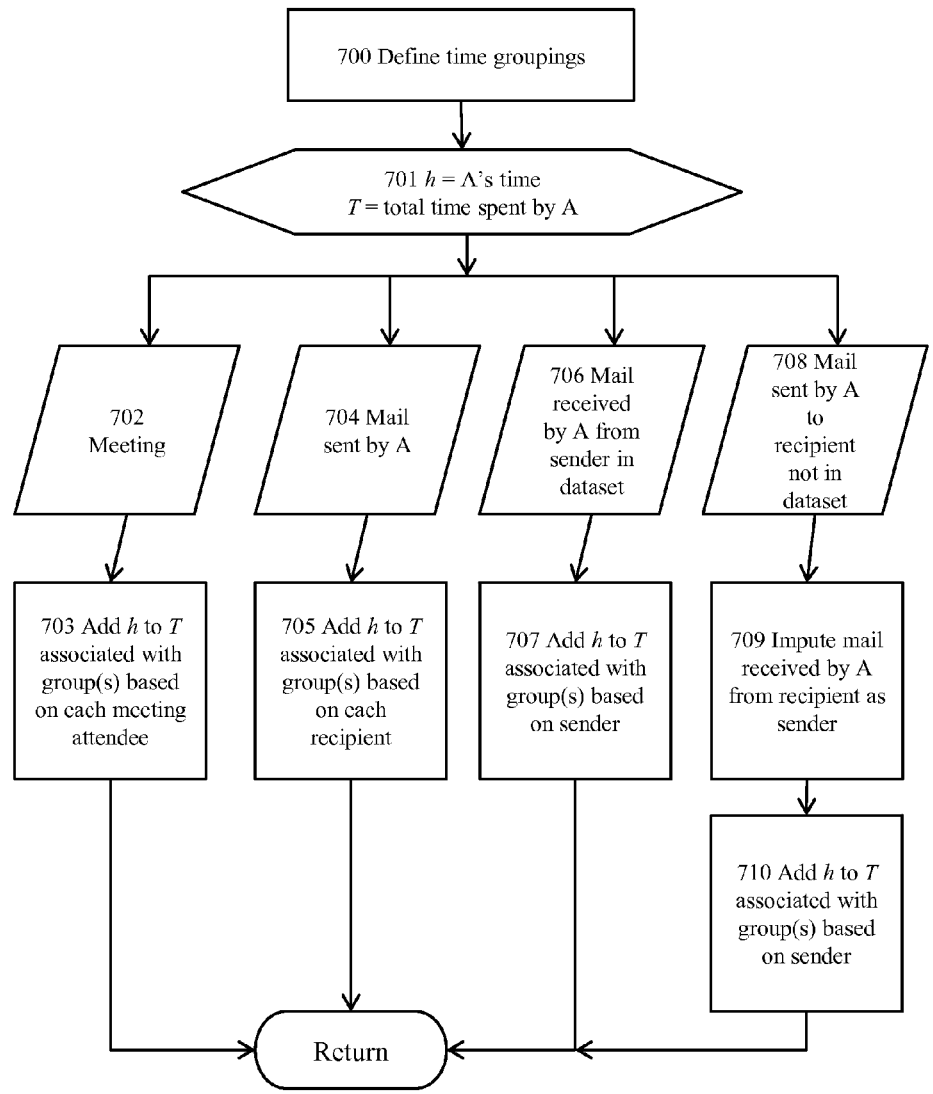
FIG. 7 is a flowchart illustrating the time spent method according to embodiments of the present invention.

Although embodiments of the time allocation method according to the present invention are described using sent mails and meetings in the above as representative of collaboration activities, other data may also be used, either alone or in combination, without departing from the spirit and scope of the present invention. For example, telephone logs, IM, and any other collaboration means that has a digital footprint may be considered. Further, end-user feedback may also be incorporate, for example, to assist in identifying calendar entries as non-meeting. Also meeting and/or mail time allocated may be further adjusted in other ways, for example, for mails sent by an attendee during a meeting, Time Spent In another approach according to the present invention, collaboration time for each member of a group is assigned using a time spent method, where the total time spent by a collaborator with one or more groups is determined. The time spent method may be used when an organization wishes to determine the total time someone spends with each group. FIG. 7 is a flowchart illustrating the time spent method according to embodiments of the present invention. First, time groupings are defined (700). The time groupings represent how A's spent time will be counted. For example, the groups may be defined by person, function, or domain. Assume that h=A's time, and T=total time spent by A (701). There is a T associated with each group. For each meeting in which A is an attendee (702), h is added to the T's associated with one or more groups based on each meeting attendee (703). For the following example groups, h would be counted as follows:

grouped by person: add h to T associated with each attendee (other than A);

grouped by function: add h to T associated with each distinct internal attendee function; and grouped by domain: add h to T associated with each distinct external attendee domain.

For each mail sent by A (704), h is added to the T's associated with one or more groups based on each recipient (705). For the following example groups, h would be counted as follows:

grouped by person: add h to T associated with each recipient;

grouped by function: add h to T associated with each distinct internal recipient function; and grouped by domain: add h to T associated with each distinct external recipient domain.

For each mail received by A from a sender in the dataset (706), h is added to the T associated with one or more groups based on the sender (707). For the following example groups, h would be counted as follows:

grouped by person: add h to T associated with the sender;

grouped by function: add h to T associated with the sender's function, if the sender is internal; and grouped by domain: add h to T associated with the sender's domain, if the sender is external.

For each mail sent by A to a recipient not in the dataset (708), a mail is imputed to be received by A from the recipient as sender (709), and h is added to the T's associated with one or more groups based on the recipient (710). For the following example groups, h would be counted as follows:

grouped by person: add h to T associated with each recipient;

grouped by function: add h to T associated with each distinct internal recipient function; and grouped by domain: add h to T associated with each distinct external recipient domain.

Consider again the following collaborators:
Alice {Sales, West}
Bob {Sales, West}
Charlie {Sales, East}
Dave {HR, East}
Eddie {OPS, Central} [no mailbox]
Fred {domain1.com}
Gene {domain2.com}
Heidi {domain2.com}
Iris {domain2.com}.

For an 1 hour meeting, T is determined as follows (703):

A's spent time grouped by person: 1 hour of time added to the T associated with each of the other attendees;

A's spent time grouped by function: 1 hour is added to each of the T's associated with Sales, HR, and OPS;

A's spent time grouped by region: 1 hour added to each of the T's associated with West, East, and Central;

A's spent time grouped by domain: 1 hour added to each of the T's associated with Domain 1 and Domain 2.

For the mail sent by Alice (704), T is determined as follows:

A's spent time grouped by person: 5 minutes is added to the T associated with each of the recipients (705); 2.5 minutes are added to each of the T's associated with Eddie, Fred, Gene, Heidi, and Iris for imputed mail received by Alice (709-710);

A's spent time grouped by function: 5 minutes is added to each of the T's associated with Sales and HR (705); 5 minutes added to the T associated with OPS (705); and 2.5 minutes added to the T associated with OPS from the imputed received mail from Eddie (709-710);

A's spent time grouped by region: 5 minutes is added to each of the T's associated with West and East (705); 7.5 minutes added to the T associated with Central from the imputed received mail from Eddie (709-710);

A's spent time grouped by domain: 7.5 minutes added to the T associated with Domain 1 (5 minutes as recipient of mail from Alice (705)+2.5 minutes from the imputed received mail from Eddie (709-710)); 12.5 minutes added to the T associated with Domain 2 (5 minutes as recipient of mail from Alice (705)+2.5*3 minutes from the imputed received mail from Domain 1 (709-710))

Push/Pull

Figure 8:
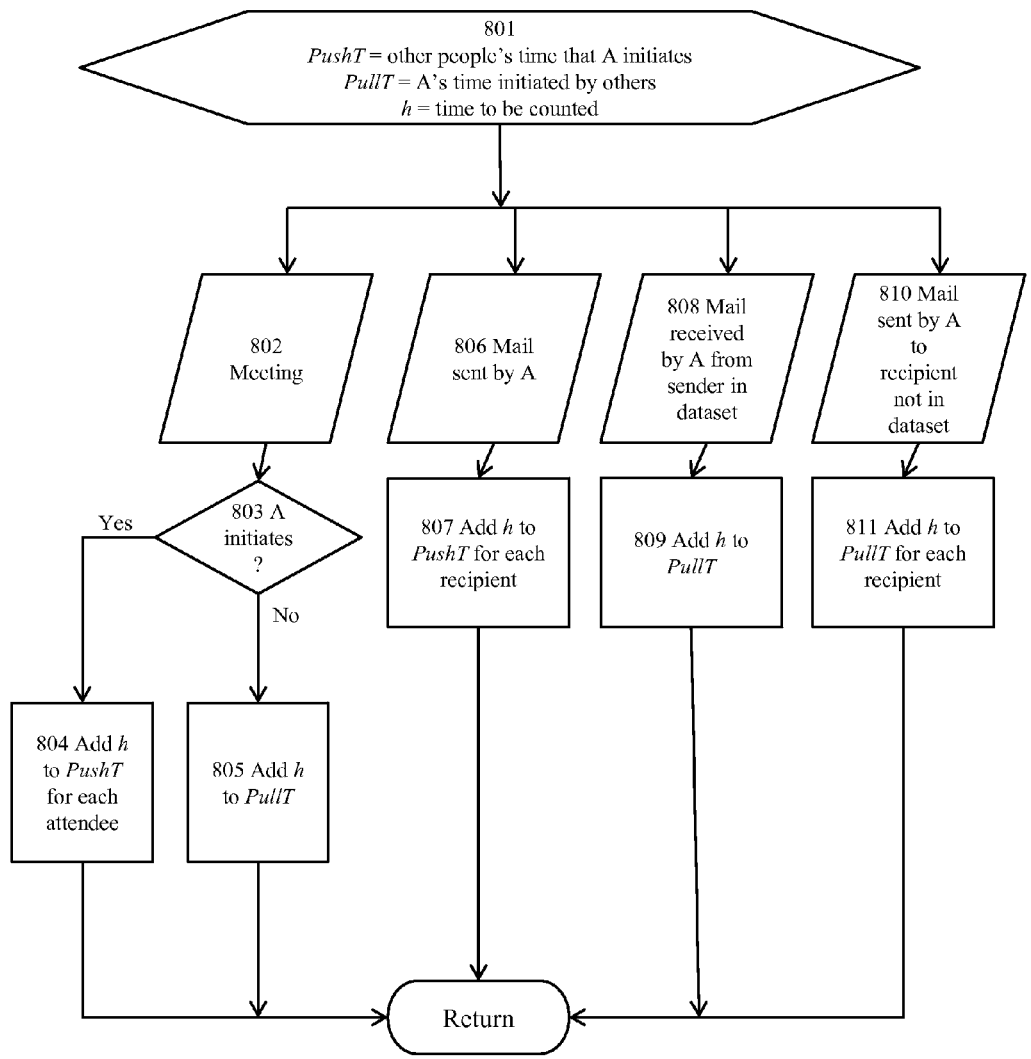
FIG. 8 is a flowchart illustrating a method for determining the push and pull metrics according to embodiments of the present invention.

Alternatively or in addition to the above methods, push and pull metrics may be determined, which takes into account the initiator of an interaction. The "Push" counts other people's hours that A initiates, while the "pull" counts A's time initiated by other people. By netting the push and pull counts, one can determine whether someone is a net "pusher" or "pullee". FIG. 8 is a flowchart illustrating a method for determining the push and pull metrics according to embodiments of the present invention. First, a push number (PushT) and a pull number (PullT) are initialized for A, and h=time to be counted (801). For each meeting (802), if A initiates/organizes the meeting (803), then h is added to the PushT for each attendee (804). If A attends a meeting that someone else initiates/organizes, then h is added to A's PullT. For a mail sent by A (806), h is added to the PushT for each recipient (who is not A) (807). For mail received by A from a sender in the dataset (808), h is added to A's PullT (809). For mail sent by A to recipients not in the dataset (810), h is added to A's PullT for each recipient (811). A's push/pull with a specific group can be determined by considering the attendees/recipients/senders who are in this group.

Methods and systems for transformation and classification of time spent in collaborative activities for assessing organization productivity and effectiveness are disclosed herein. Data from certain activities by collaborators are mined as representative of the collaboration activities, and in combination with organizational structure data, time is allocated between people, teams, and companies for the purpose of assessing organizational productivity and effectiveness.

The methods and systems described herein require no manual data gathering or imposition on collaborators to provided data. Real data for the collaborative activities are used, instead of self-reported data. This provides a more granular picture of how time is allocated to relationships and activities than could be gathered manually.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method implemented by a processor, the method comprising:
   extracting collaboration data from a plurality of computer systems of a plurality of collaborators and storing the collaboration data as a dataset, the collaboration data reflecting sent emails in mailboxes and a plurality of meetings in calendars, the sent emails and plurality of meetings being provided by the plurality of computer systems;
   defining a plurality of attributes for the plurality of collaborators;
   defining a group of collaborators by filtering based at least on the plurality of attributes; and
   assigning collaboration time for individual members of the group using the collaboration data of the dataset, the assigning comprising a meeting de-duplication process involving:
      determining whether two or more meetings of the plurality of meetings comprise overlapping times for one or more attendees; and
      in response to determining that the two or more meetings comprise overlapping times for the one or more attendees, adjusting time durations for the two or more meetings, such that the adjusted time durations do not exceed an actual time duration for the two or more meetings.

2. The method of claim 1, the assigning comprising:
   determining whether a given meeting comprise duplicate attendees; and
   in response to determining that the given meeting comprises duplicate attendees, removing one of the duplicate attendees from the given meeting.

3. The method of claim 1, the assigning comprising:
   determining whether a given meeting comprises an all-day, all-week, or recurring meeting; and
   in response to determining that the given meeting comprises the all-day, the all-week, or the recurring meeting, adjusting a time duration of the given meeting to reflect a work-day length for at least one day of the given meeting.

4. The method of claim 1, the assigning comprising:
   determining whether a given meeting is a real meeting; and
   in response to determining that the given meeting is not a real meeting, removing the given meeting from the dataset.

5. The method of claim 1, further comprising:
   defining a plurality of partitions based at least on the plurality of attributes, wherein the plurality of partitions represent different types of collaborations involving the group.

6. The method of claim 2, wherein, for a given member of the group, the assigning comprises:
   determining that a given meeting includes the given member as an attendee;
   identifying a matching partition of the plurality of partitions that matches other attendees of the given meeting; and
   allocating a collaboration time for the given member to the matching partition.

7. The method of claim 2, the assigning comprising:
   determining that a given email is sent by a given member;
   identifying a matching partition of the plurality of partitions that matches recipients of the given email;
   determining a delta time between when the given email was sent and an immediately previously sent email by the given member;
   determining a lesser of a collaboration time or the delta time; and
   allocating the lessor of the collaboration time or the delta time for the given member to the matching partition.

8. The method of claim 2, wherein, for a given member of the group, the assigning comprises:
   determining that a given email is received by the given member from a sender in the dataset;
   identifying a matching partition of the plurality of partitions that matches the sender; and
   allocating a collaboration time for the given member to the matching partition.

9. A computing system, comprising:
   a processor; and
   a computer readable medium having computer readable program code embodied therewith, the computer readable program code being configured to:
   extract collaboration data from a plurality of collaborator computing systems of a plurality of collaborators and store the collaboration data as a dataset, the collaboration data reflecting sent emails in mailboxes of the plurality of collaborator computer systems;
   identify a plurality of attributes for the plurality of collaborators;
   identify a group of collaborators by filtering based at least on the plurality of attributes;
   determine that a given email is sent by a given member to a recipient not in the dataset;
   identify a plurality of partitions of different types of collaborations involving the group of collaborators;
   identify a matching partition of the plurality of partitions that matches the recipient not in the dataset; and
   allocate an email collaboration time for the given member to the matching partition, the email collaboration time reflecting the given email.

10. The computing system of claim 9, wherein the collaboration data reflects meetings in calendars provided by the plurality of collaborator computer systems.

11. The computing system of claim 10, wherein the computer readable program code is further configured to:
   identify a given meeting that includes the given member as an attendee; and
   add a meeting collaboration time for the given meeting to a total collaboration time associated with the given member.

12. The computing system of claim 9, wherein the computer readable program code is further configured to:
   impute another email as being received by the given member based at least on another given electronic email sent by the given member.

13. The computing system of claim 9, wherein the computer readable program code is further configured to:
    determine that another email is received by the given member from a sender in the dataset; and
    add another email collaboration time for the another email to a total collaboration time for the given member.

14. The computing system of claim 9, wherein the computer readable program code is further configured to:
    add the email collaboration time to a total collaboration time associated with the given member.

15. The computing system of claim 9, embodied as a server separate from the plurality of collaborator computing systems.

16. A method implemented by a processor, the method comprising:
    extracting collaboration data from a plurality of computer systems of a plurality of collaborators and storing the collaboration data as a dataset, the collaboration data reflecting sent mails in mailboxes and meetings in calendars, the mailboxes and calendars being implemented by the plurality of computer systems;
    defining a plurality of attributes for the plurality of collaborators;
    defining a group of collaborators by filtering based at least on the plurality of attributes; and
    assigning collaboration time for individual members of the group using the collaboration data of the dataset,
    the collaboration time for a given member distinguishing between push collaboration time initiated by the given member and pull collaboration time initiated by one or more other members.

17. The method of claim 16, further comprising:
    determining that a given email is sent by the given member; and
    adding a corresponding email collaboration time to associated push collaboration times for recipients of the given email.

18. The method of claim 16, further comprising:
    determining a given email is received by the given member from a sender in the dataset; and
    adding a corresponding email collaboration time to the pull collaboration time of the given member.

19. The method of claim 16, further comprising:
    determining a given email is sent by the given member to a recipient not in the dataset; and
    adding a corresponding email collaboration time to a corresponding pull collaboration time for a recipient of the given email.

20. The method of claim 16, further comprising:
    classifying the given member based at least on the push collaboration time and the pull collaboration time.

21. The method of claim 16, further comprising:
    classifying the given member as a net pusher based at least on the push collaboration time and the pull collaboration time.

22. The method of claim 16, further comprising:
    classifying the given member as a net puller based at least on the push collaboration time and the pull collaboration time.

23. The method of claim 16, performed by a server communicably connected to the plurality of computer systems by a network.

* * * * *